May 23, 1967  P. B. JOHNSON ETAL  3,320,811
GAUGE HEAD COVER AND BOLT RETAINER
Filed May 7, 1964  3 Sheets-Sheet 1
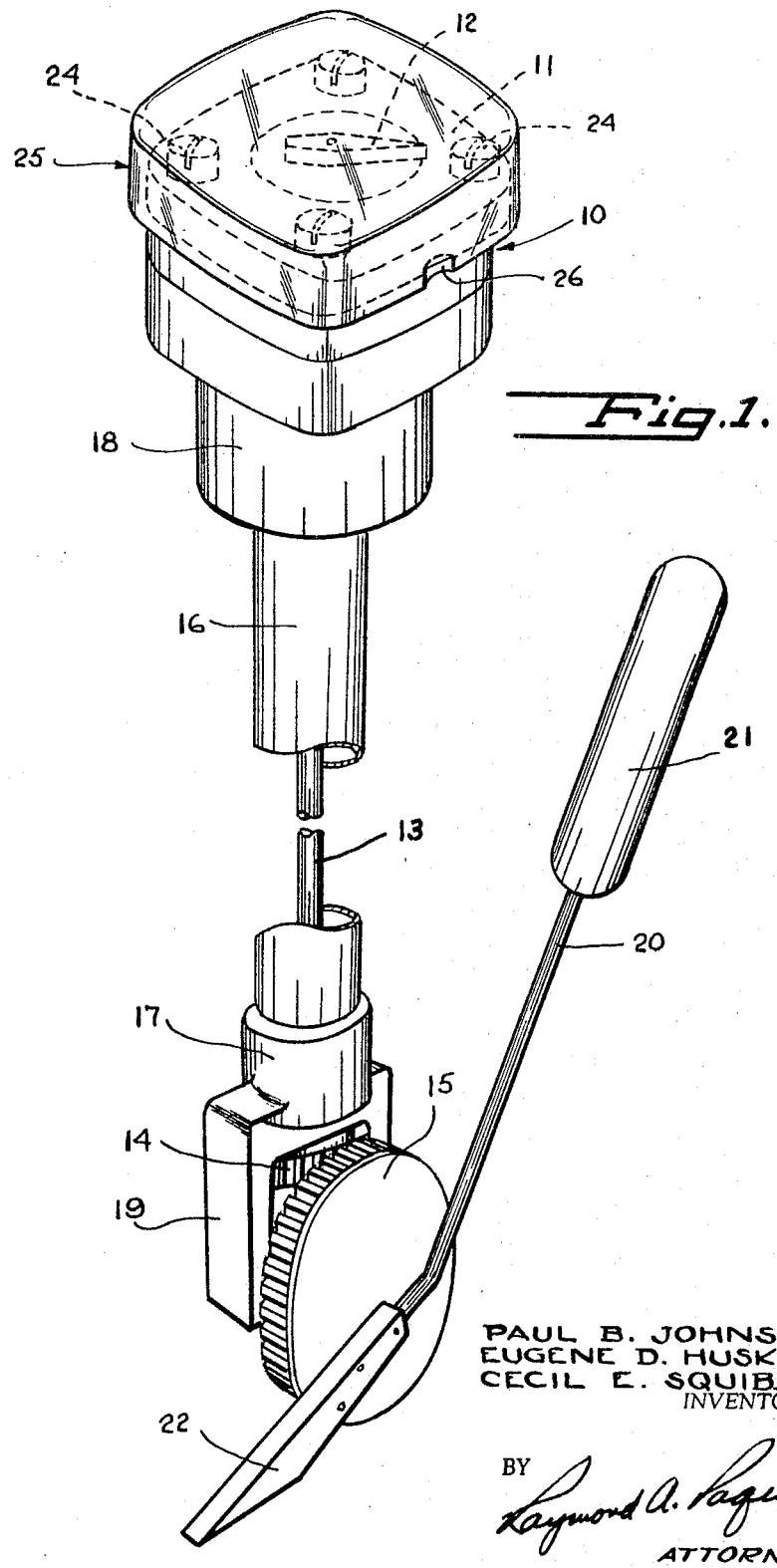
PAUL B. JOHNSON
EUGENE D. HUSKEY
CECIL E. SQUIBB
INVENTORS.
BY Raymond A. Paquin
ATTORNEY.

May 23, 1967   P. B. JOHNSON ETAL   3,320,811
GAUGE HEAD COVER AND BOLT RETAINER
Filed May 7, 1964   3 Sheets-Sheet 2
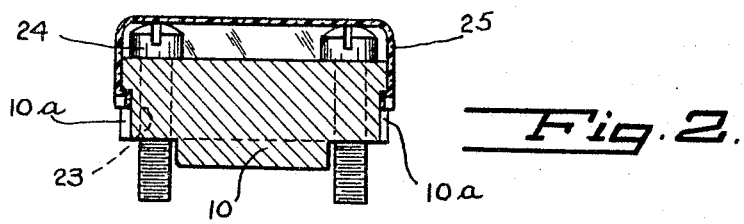
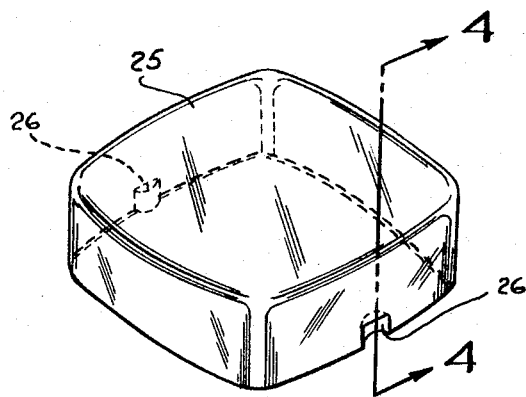
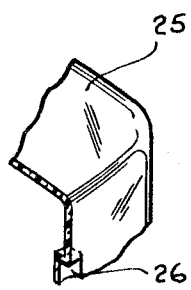
PAUL B. JOHNSON
EUGENE D. HUSKEY
CECIL E. SQUIBB
INVENTORS.
BY
ATTORNEY.

May 23, 1967 P. B. JOHNSON ETAL 3,320,811
GAUGE HEAD COVER AND BOLT RETAINER
Filed May 7, 1964 3 Sheets-Sheet 3

PAUL B. JOHNSON
EUGENE D. HUSKEY
CECIL E. SQUIBB
INVENTORS.

BY
ATTORNEY.

United States Patent Office 3,320,811
Patented May 23, 1967

3,320,811
GAUGE HEAD COVER AND BOLT RETAINER
Paul B. Johnson and Eugene D. Huskey, Garland, and Cecil E. Squibb, Dallas, Tex., assignors to J. Y. Taylor Mfg. Co., Inc., a corporation of Texas
Filed May 7, 1964, Ser. No. 365,646
5 Claims. (Cl. 73—431)

This invention relates to new and useful improvements in liquid level gauges and has particular reference to the provision of a new and improved liquid level gauge head cover which is particularly adapted for affording protection to the gauge head of the gauge and yet is readily and speedily removable therefrom.

An object of the present invention is to provide a new and improved gauge head cover for a liquid level gauge, which head cover is particularly adapted to be utilized thereon such as to afford protection to the gauge head.

Another object of the present invention is to provide a new and improved gauge head cover of the type set forth which is particularly adapted to be utilized such as to provide a protective covering for the gauge head during shipment and/or use of the gauge.

Another object of the invention is to provide a new and improved gauge head cover of the type set forth which is particularly adapted to serve as a paint protector for the gauge head during the painting of the gauge.

Another object is to provide a new and improved gauge head cover of the type set forth which is adapted to serve to retain the gauge head mounting bolts in their proper mounting positions.

Another object is to provide a new and improved gauge head cover of the type set forth which allows ready and simple access to the gauge head bolts, and yet serves to provide said protective covering for said gauge head.

Another object is to provide a new and improved gauge head cover of the type set forth which is readily and speedily removable from the gauge head such that it may be installed thereupon or removed therefrom as desired.

Other objects and advantages of the invention will be apparent from the following description taken in connection with the accompanying drawings. It will be understood that changes may be made in the details of construction and arrangement of parts shown and described as the preferred forms of the invention have been given by way of illustration only.

Referring to the drawings:

FIG. 1 is a perspective view illustrating a liquid level gauge embodying the present invention;

FIG. 2 is a sectional side view of the gauge head of the gauge shown in FIG. 1 in combination with an embodiment of the invention;

FIG. 3 is a perspective view of the form of invention shown in FIG. 2;

FIG. 4 is a fragmentary, sectional view taken on line 4—4 of FIG. 3, looking in the direction of the arrows;

Figure 5:
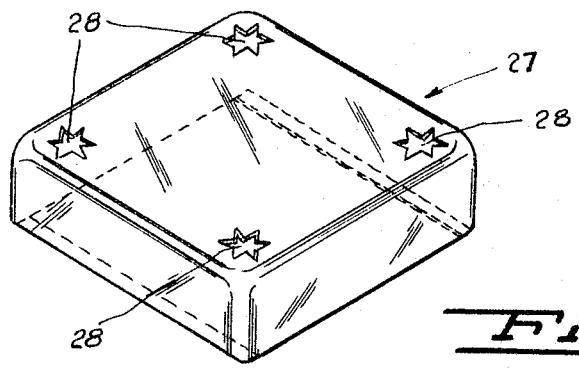
FIG. 5 is a view in perspective of another form of the invention.

Referring more particularly to the drawings wherein similarly reference characters designate corresponding parts throughout the several views, and with particular reference to FIG. 1, in said figure a gauge head cover constructed according to the present invention is illustrated with respect to a liquid level gauge of a certain, specific construction. It will be understood, however, that the form of liquid level gauge illustrated in the drawings has been therein shown for the purposes of illustration only; and the gauge head cover of the present invention is equally well applicable to liquid level gauges of construction and design other than that illustrated in FIG. 1 of the drawings.

The form of liquid level gauge illustrated in FIG. 1 comprises a gauge head which is designated generally at 10 having a gauge face 11 which is in the form of a scale or dial and is operatively associated with the pointer or indicator 12 such that the position of said indicator 12 on said scale or dial indicates the level of the liquid in the tank or other container accompanied by the gauge.

Gauge head 10, furthermore, is operatively connected to a rod or shaft 13 which has its opposite end operatively connected to gear member 14 which meshes with gear member 15, said rod or shaft 13 being enclosed within the cylinder or tubular member 16 which is secured at its opposite ends to a flange 18 on the lower end of said gauge head 10 and a flange 17 on the upper end of the pivot fork 19. Said gear member 14 is positioned within said pivot fork 19; and gear member 15 is pivotally connected to said fork 19.

Said gear member 15 is mounted upon a shaft 20, the opposite ends of said shaft serving to carry a float 21 and a counterweight 22 such that relative movements of said float 21 and said counterweight 22 to one another convey the level of liquid in the container being measured to the indicator 12 on the face of gauge head 10 through the gear members 14 and 15, shaft 13, and associated mechanism.

Referring more particularly to the form of gauge head 10 illustrated in FIG. 1, such is provided with a series of holes or openings 23 through which the gauge head mounting bolts 24 are positioned such as to operatively secure said gauge head to the tank on which the gauge is employed. Said gauge head 10, furthermore, includes indentures or recesses 10a in its opposite sides.

The form of gauge head cover shown in FIG. 1 is therein designed generally at 25 and is shown in detail in FIGS. 2 through 4.

Said gauge head cover 25, as shown in FIGS. 1 through 4, is comprised of a plastic or similar material and may be made transparent or otherwise depending upon whether it is particularly desired for use during shipment of the liquid level gauge or during use thereof. Said gauge head cover 25, furthermore, is designed such as to fit over the gauge head 10 and the gauge head mounting bolts 24 and is provided with indentures or grooves 26 in its opposite sides corresponding to the indentures or recesses 10a in the opposite sides of the gauge head 10. Said gauge head cover is retained in position over the gauge head and mounting bolts by the snap-fit of said indentures 26 into the indentures 10a in said gauge head. Removal of said cover from the gauge head is accomplished by the pulling of said indentures out of engagement; and installation thereof is performed by the forcing of said indentures into engagement.

As an alternative form of construction, forms of engagement of said gauge head 10 and said gauge head cover 25 other than said co-mating indentures could be utilized providing that said rapid and simple attachment and detachment of said members is still maintained.

From the foregoing it will be seen that the gauge head cover 25 illustrated in FIGS. 1 through 4 affords a protective covering to the gauge head 10, maintains the gauge head mounting bolts 24 in their mounting position, is readily and speedily attachable to and detachable from the gauge head 10, yet permits ready and easy access to said mounting bolts 24.

Figure 6:
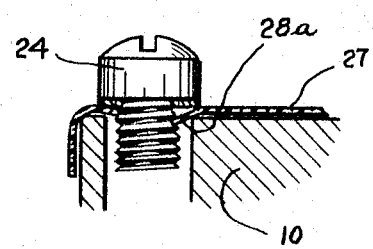
FIG. 6 is a fragmentary, sectional view of the form of invention shown in FIG. 5 in operative position upon the gauge head of a liquid level gauge.
Figure 7:
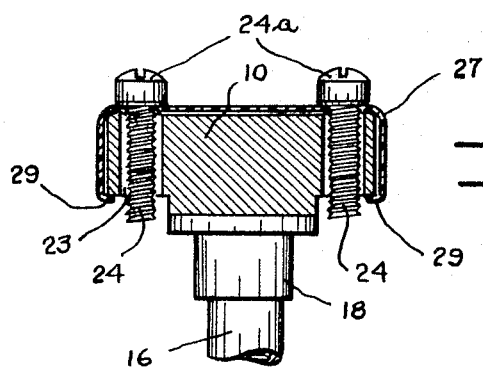
FIG. 7 is a partially sectional view illustrating the form of invention shown in FIGS. 5–6 in combination with the gauge head of a liquid level gauge.

With particular reference to the form of gauge head cover shown in FIGS. 5–7, such is comprised of a plastic or other suitable material and, like the head cover of FIGS. 1–4, may be either transparent or otherwise as desired.

Said head cover, furthermore, is designated generally at 27 in FIG. 5 and includes holes or openings 28 corresponding in number and position to the holes or openings 23 in the gauge head 10 such that the gauge head mounting bolts 24 may be positioned through both said openings 23 and said openings 28. Holes or openings 28, furthermore, are so constructed such that the edges 28a of said holes have a plurality of projections extending into the opening serving to provide a spring-back action against the thread of mounting bolts 24 and, thereby, retaining said mounting bolts 24.

Cover 27 may be provided with flanges or tabs such as those shown at 29 in FIG. 7 for retaining said cover upon the gauge head 10 or may, alternatively, be press fitted around the sides of the gauge head.

In the installation of the cover upon a gauge head, said cover is slipped over said gauge head and secured thereon either by means of said flanges or tabs 29 or by a press fit around the sides of the gauge head 10; and the gauge head mounting bolts are pushed through the corresponding openings 28 and 23 in the cover 27 and the gauge head 10, respectively, and are screwed therein. The edges 28a of the opening 28 in the cover 27 serve to retain said bolts 24 by spring-back action such that the bolt heads 24a remain above the cover 27 and are external thereto.

Removal of the cover 27 from the gauge head 10 may be accomplished by the simple process of breaking away the cover from said head 10 such as by cutting or tearing, and, thus, does not necessitate the removal or disturbance of the mounting bolts 24.

It will be understood that, although the openings or holes in the cover 27 have been illustrated as being substantially of a star shape, said openings or holes may be otherwise constructed providing that they are so constructed such that their edges function such as to retain the mounting bolts 24 by their spring-back action against the bolt threads.

It will, further, be understood that, although the gauge head cover of the present invention has been hereinbefore described and illustrated with reference to a specific embodiment of a liquid level gauge, such has been done for the purpose of illustration only.

The operation of the invention is believed to be apparent from the foregoing.

From the foregoing it will be seen that we have provided new and improved means for accomplishing all of the objects of the invention.

We claim:

1. A protective cover for the gauge head of a liquid level gauge, which gauge head includes a plurality of openings for a series of mounting bolts to be positioned through said openings, said cover having a portion extending over said gauge head, which portion is provided with a plurality of openings corresponding to said openings in said gauge head such that said mounting bolts may simultaneously be positioned through said openings in said cover and said gauge head, said openings in said cover being formed with a plurality of projections extending into the opening to retain said bolts by spring-back action against the threads of said bolts, and means for maintaining said cover upon said gauge head.

2. A protective cover for the gauge head of a liquid level gauge, which gauge head includes a plurality of openings for a series of mounting bolts to be positioned through said openings, said cover having a portion extending over said gauge head, which portion is provided with a plurality of openings corresponding to said openings in said gauge head such that said mounting bolts may simultaneously be positioned through said openings in said cover and said openings in said gauge head, said openings in said cover being formed so as to retain said mounting bolts in said openings in said cover, and retaining means for maintaining said cover upon said gauge head, said retaining means comprising cooperating engaging means upon said cover and the sides of said gauge head, respectively.

3. A protective cover for the gauge head of a liquid level gauge, which gauge head has a series of openings therein for a corresponding series of mounting bolts to be positioned through said openings, said cover being comprised of a flexible material and including a portion extending over said gauge head and having a series of openings corresponding to and aligned with the openings in said gauge head such that said mounting bolts may simultaneously be positioned through said openings in said cover and said openings in said gauge head, said openings in said cover being provided adjacent their edges with means for retaining the heads of said mounting bolts above said cover and said bolts in said openings in said cover, and means on said gauge head and said cover for retaining said cover on said gauge head, said last mentioned retaining means comprising interengagement between the sides of said gauge head and the inner surface of said cover.

4. A protective cover for a liquid level gauge head which gauge head has a dial and an indicator operatively associated with said dial and said gauge head having a series of openings for receiving the mounting bolts, said protective cover being made of a plastic material and having a first portion for covering the gauge dial and depending side portions extending angularly from said first portion and overlying the sides of the gauge head, said first portion having a series of openings adapted to be aligned with the openings in the gauge head, said openings in said first portion of said cover each having means engaging the periphery of a mounting bolt to retain said mounting bolt in position through said opening whereby said depending side portions of said cover will retain said cover on the gauge head and said mounting bolts will be retained in said openings in said cover in position on the gauge head.

5. A protective cover for a liquid level gauge head which gauge head has a dial and an indicator operatively associated with said dial and said gauge head having a series of openings for receiving the mounting bolts, said protective cover being made of a plastic material and having a first portion for covering the gauge dial and depending side portions extending angularly from said first portion and overlying the side of the gauge head, said first portion having a series of openings adapted to be aligned with the openings in the gauge head and means engaging the periphery of said mounting bolts to retain said mounting bolts in position through said aligned openings in said gauge head and cover whereby said depending side portions of said cover will retain said cover on the gauge head and said mounting bolts will be retained in said openings in said gauge head and cover in position on the gauge head.

References Cited by the Examiner

UNITED STATES PATENTS

| | | | |
|---|---|---|---|
| 712,070 | 10/1902 | Johnson et al. | 73—317 |
| 995,893 | 6/1911 | Neitzel. | |

(Other references on following page)

UNITED STATES PATENTS

| | | | |
|---|---|---|---|
| 1,459,588 | 6/1923 | Hoffman | 220—60 X |
| 1,631,684 | 6/1927 | Hoyle | 324—156 |
| 1,713,824 | 5/1929 | Farley | 150—52 |
| 1,927,780 | 9/1933 | Anderson | 220—3.8 X |
| 2,024,227 | 12/1935 | Jones | 220—60 |
| 2,197,220 | 4/1940 | Kost | 85—36 |
| 2,285,658 | 6/1942 | Hitchcock | 73—431 X |
| 2,473,581 | 6/1949 | Ford | 73—317 X |
| 2,584,446 | 2/1952 | Hastings et al. | 73—317 |
| 2,795,955 | 6/1957 | Hall | 73—317 |
| 2,866,940 | 12/1958 | Lamb | 220—60 X |
| 3,205,712 | 9/1965 | Hoff | 73—431 |

FOREIGN PATENTS 267,488    9/1929    Italy.

DAVID SCHONBERG, *Primary Examiner.*

JOSEPH R. LECLAIR, LOUIS R. PRINCE, *Examiners.*

M. L. MINSK, D. M. YASICH, *Assistant Examiners.*